(12) United States Patent  
Fujii

(10) Patent No.: US 6,494,541 B1
(45) Date of Patent: Dec. 17, 2002

(54) ROTATIONAL DIRECTION DETECTING SWITCH AND SEAT BELT RETRACTOR WITH ROTATIONAL DIRECTION DETECTING SWITCH

(75) Inventor: Hiroaki Fujii, Tokyo (JP)

(73) Assignee: Takata Corporation, Tokyo (JP)

( * ) Notice: Subject to any disclaimer, the term of this patent is extended or adjusted under 35 U.S.C. 154(b) by 275 days.

(21) Appl. No.: 09/698,147

(22) Filed: Oct. 30, 2000

(30) Foreign Application Priority Data

Nov. 11, 1999 (JP) ............................................. 11-320875

(51) Int. Cl.$^7$ ............................ B60R 22/00; B60R 22/38
(52) U.S. Cl. ..................... 297/474; 297/475; 200/61.39; 200/61.58 B
(58) Field of Search ................................ 297/474, 475, 297/476; 200/61.17, 61.39, 61.58 B

(56) References Cited

U.S. PATENT DOCUMENTS

| | | | |
|---|---|---|---|
| 3,771,742 A | * 11/1973 | Okada | .......................... 242/382 |
| 4,818,743 A | * 4/1989 | Simpson et al. | ............. 502/210 |
| 5,518,197 A | * 5/1996 | Gray | ........................ 242/382.2 |
| 5,788,281 A | * 8/1998 | Yanagi et al. | ................ 180/282 |
| 5,887,814 A | * 3/1999 | Matsuki et al. | ........... 242/379.1 |
| 6,196,633 B1 | * 3/2001 | Yamamoto et al. | .......... 297/474 |

* cited by examiner

*Primary Examiner*—Anthony D. Barfield
(74) *Attorney, Agent, or Firm*—Kanesaka & Takeuchi

(57) ABSTRACT

A rotational direction detecting switch detects a rotational direction of a shaft, preferably of a seat belt retractor. The detecting switch is formed of a switch plate having a support portion for pivotally supporting the switch plate and restricting members spaced apart from each other for restricting a rotating angle of the switch plate, a spring member attached to the switch plate between the restricting members for elastically contacting an outer circumference of the shaft, and a switch situated near the switch plate for detecting a rotating position of the switch plate. Since the spring member is used to contact the shaft, the elastic deformation is large. Therefore, tolerance in manufacturing the switch plate can be large, so that its assembling accuracy may not be so accurate. However, the rotating direction can be positively detected.

7 Claims, 5 Drawing Sheets

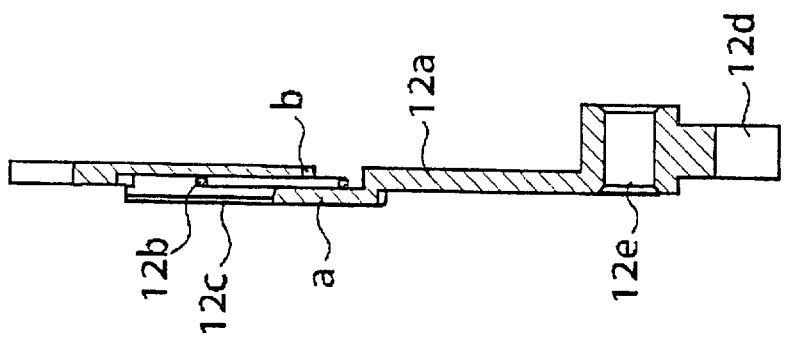
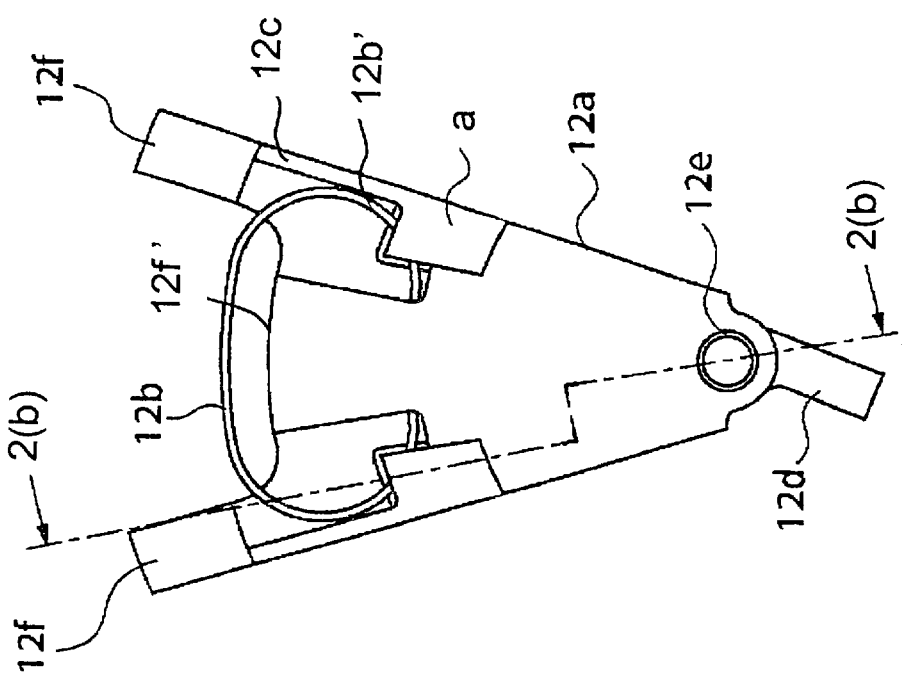

ROTATIONAL DIRECTION DETECTING SWITCH AND SEAT BELT RETRACTOR WITH ROTATIONAL DIRECTION DETECTING SWITCH

BACKGROUND OF THE INVENTION AND RELATED ART STATEMENT

The invention relates to a switch to be used for detecting a rotational direction of a rotating member in a seat belt retractor to be mounted to a vehicle, such as an automobile, and a seat belt retractor using the same.

A seat belt winding device or retractor to be attached to an automobile has such a function that when a passenger takes a seat and pulls out a seat belt and a tongue is fastened to a buckle device, an extra withdrawing portion of the seat belt is absorbed or retracted. In order to provide the function, in a seat belt retractor of the prior art, a single return spring has been used. When a seat belt is put on a passenger's shoulder, the passenger pulls out the seat belt against an urging force of the return spring and leaves his hand from the seat belt after a tongue is engaged with a buckle, so that an extra withdrawing portion of the seat belt is wound up by a seat belt retractor until the seat belt fits the passenger's body.

As explained above, in the seat belt retractor, it is required to satisfy the following points at the same time:

(1) the excessively withdrawing portion of the seat belt is positively wound up until the seat belt fits the passenger's body, or when the passenger does not wear the seat belt, the withdrawn seat belt is positively stored in a storing portion; and (2) an unnecessary pressing feeling is not given to a breast portion of the passenger in a normal wearing state.

However, in the seat belt retractor using an urging force of the single return spring, there have been such problems that in case a spring having a weak urging force is used to reduce the pressing feeling against the chest portion of the passenger, a winding force when the seat belt is wound up, i.e. at a storing time, becomes weak, so that an operating ability and storing ability are lowered. On the contrary, in case a spring having a strong urging force is used to obtain a sufficient winding force at the time of winding, the pressing feeding against the chest portion of the passenger at the normal wearing time becomes large.

Also, in a conventional seat belt retractor, there have been problems such that since the single return spring is built in, as a withdrawn amount or length of the seat belt is increased, the return spring is wound to thereby increase its urging force, and as the withdrawing amount of the seat belt is increased, the withdrawing force is increased.

As a device to solve the above problems, the present inventors invented a seat belt winding device or retractor for winding a seat belt by combining a return spring and a motor, and filed a patent application as Japanese Patent Application No. 11-10184 (hereinafter referred to as "former invention", not prior art). In the seat belt retractor using the motor for winding the seat belt including the winding device of the former invention, generally, it is required that the motor is stopped when a passenger pulls out the seat belt to allow the seat belt to be pulled out with a small force. As a device for providing this mechanism, there has been proposed a device wherein a rotational direction of a shaft of a spool around which the seat belt is wound is detected, and in case the shaft is rotated in a seat-belt withdrawing direction, power supply to the motor is stopped. The device is also employed in the former invention.

FIG. 5 is a schematic view showing a rotational direction detecting switch used in the former invention. A base frame 21 is provided with a spool 22, and a seat belt is wound around the spool 22. When the spool 22 is driven in a winding or retracting direction, the seat belt is wound up. On the contrary, when the seat belt is pulled out manually, the spool 22 is rotated in a direction opposite to the winding direction. A spool shaft input gear directly connected to the spool shaft is provided with a ring-shape groove 23.

The rotational direction detecting switch includes a switch plate 24 and a limit switch 25, and the switch plate 24 is rotated around a rotating pin 26 as a shaft. Both ends of the switch plate 24 are provided with guides 24a, and when the switch plate 24 is rotated for a predetermined region, the guide 24a hits the ring-shape groove 23 to thereby restrict its rotating region, i.e. angle.

The ring-shape groove 23 contacts a circular arc edge 24b of the switch plate 24. A circular arc groove 24c is formed on an inner side along the circular arc edge 24b. Therefore, when the circular arc edge 24b abuts against the ring-shape groove 23, the circular arc edge 24b is slightly bent to thereby provide a pressing force. Thus, the switch plate 24 is rotated without slipping according to the rotation of the ring-shape groove 23.

FIG. 5 shows a state where the switch plate 24 located at an initial position, i.e. two dotted chain lines, has rotated in a counter-clockwise direction according to a rotation in a clockwise direction of the spool 22, i.e. according to the withdrawal of the seat belt. Under the state, a contact arm 24d provided at a tail portion of the switch plate pushes a movable piece to turn on a limit switch 25. Accordingly, the control device detects that the seat belt has been withdrawn.

In the rotating direction detecting switch according to the former invention as described above, the switch plate 24 is integrally molded of a material, such as a resin, having a certain elasticity. However, since a quantity of an elastic deformation of the circular arc edge 24b is small, in case the rotating shaft of the spool is de-centered or biased, a sufficient pressing force can not be obtained, so that the switch plate 24 is not rotated or, conversely, the pressing force is too strong to thereby damage or wear the circular arc edge 24b. Also, there have been problems such that, by the same reason as mentioned above, a tolerance or manufacturing allowable error of the switch plate 24 becomes small, and a high assembling accuracy is required. Further, since a spool shaft input gear having the ring shape groove 23 and the switch plate 24 must be assembled separately, it is not easy to assemble the rotating direction detecting switch.

In view of the problems, the present invention has been made, and an object of the invention is to provide a rotational direction detecting switch, wherein even if a relative positional accuracy between a rotating member, a rotating direction of which is detected, and the switch plate is not so accurate, a relative positional relationship can be detected.

Another object of the present invention is to provide a rotational direction detecting switch as stated above, wherein an assembling can be easily carried out.

A further other object of the present invention is to provide a seat belt retractor, wherein the rotational direction detecting switch as stated above is employed.

Further objects and advantages of the invention will be apparent from the following description of the invention.

SUMMARY OF THE INVENTION

To attain the above objects, according to a first aspect of the invention, there is provided a rotational direction detecting switch including a spring member elastically contacting an outer circumference of a rotating member; a switch plate for supporting the spring member arranged to rotate around a supporting point and having members for restricting a rotating angle thereof; and a switch for detecting a rotational position of the switch plate.

In the rotational direction detecting switch, the spring member supported by the switch plate elastically contacts the outer circumference of the rotating member to thereby generate an elastic force, so that a friction force is generated between the rotating member and the spring member. Thus, the spring member is moved by the friction force according to rotation of the rotating member, and the switch plate supporting the spring member is rotated around the supporting point. The rotation of the switch plate is detected by the switch, such as a limit switch and a proximity switch, to thereby detect the rotational direction thereof. Incidentally, since the switch plate is provided with the members for restricting its rotating angle, the rotation of the switch plate is limited within a predetermined region.

In the rotational direction detecting switch according to the first aspect, since the spring member is used as a member to contact the rotating member, its possible deformation quantity is large, so that even if a rotating shaft of the rotating member is slightly biased, or relative attaching positions of the rotating member and the switch plate are changed, there is no risk that a sufficient force for rotating the switch plate can not be obtained, and that the spring member and the switch plate are damaged. Incidentally, the members for restricting the rotating angle of the switch plate may be integrally formed with the switch plate.

To attain the above objects, according to a second aspect of the invention, in the rotational direction detecting switch according to the first aspect, the members for restricting the rotating angle are projecting members formed on both sides of a forward edge of the switch plate. The projecting members abut against the rotating member to restrict the rotation of the switch plate. Forward edges of the projecting members are connected by a connecting member to thereby form a loop with the forward edge portion of the switch plate, the projecting members and the connecting member to surround the rotating member.

In the rotational direction detecting switch of the second aspect, when the switch plate is incorporated, the rotating member is inserted into the loop formed by the forward edge portion of the switch plate, the projecting members and the connecting member, and the rotating member and the switch plate are incorporated as a sub-unit. Thus, the rotational direction detecting switch can be easily assembled. Incidentally, the projecting members and the connecting member may be formed integrally.

To attain the above objects, according to a third aspect of the invention, there is provided a seat belt retractor having the rotational direction detecting switch of the first or second aspect.

In the seat belt retractor of the invention, the rotational direction detecting switch according to the first or second aspect is used, the rotational direction of the spool can be positively detected to thereby provide the seat belt rector performing a reliable operation. Also, in case the rotational direction detecting switch according to the second aspect is employed, an assembling work can be easily carried out.

BRIEF DESCRIPTION OF THE DRAWINGS

FIG. 2(a) is an enlarged view of a rotational direction detecting portion of a rotational direction detecting switch of an embodiment according to the present invention;

FIG. 2(b) is a sectional view taken along line 2(b)—2(b) in FIG. 2(a);

DETAILED DESCRIPTION OF PREFERRED EMBODIMENTS

Figure 1:
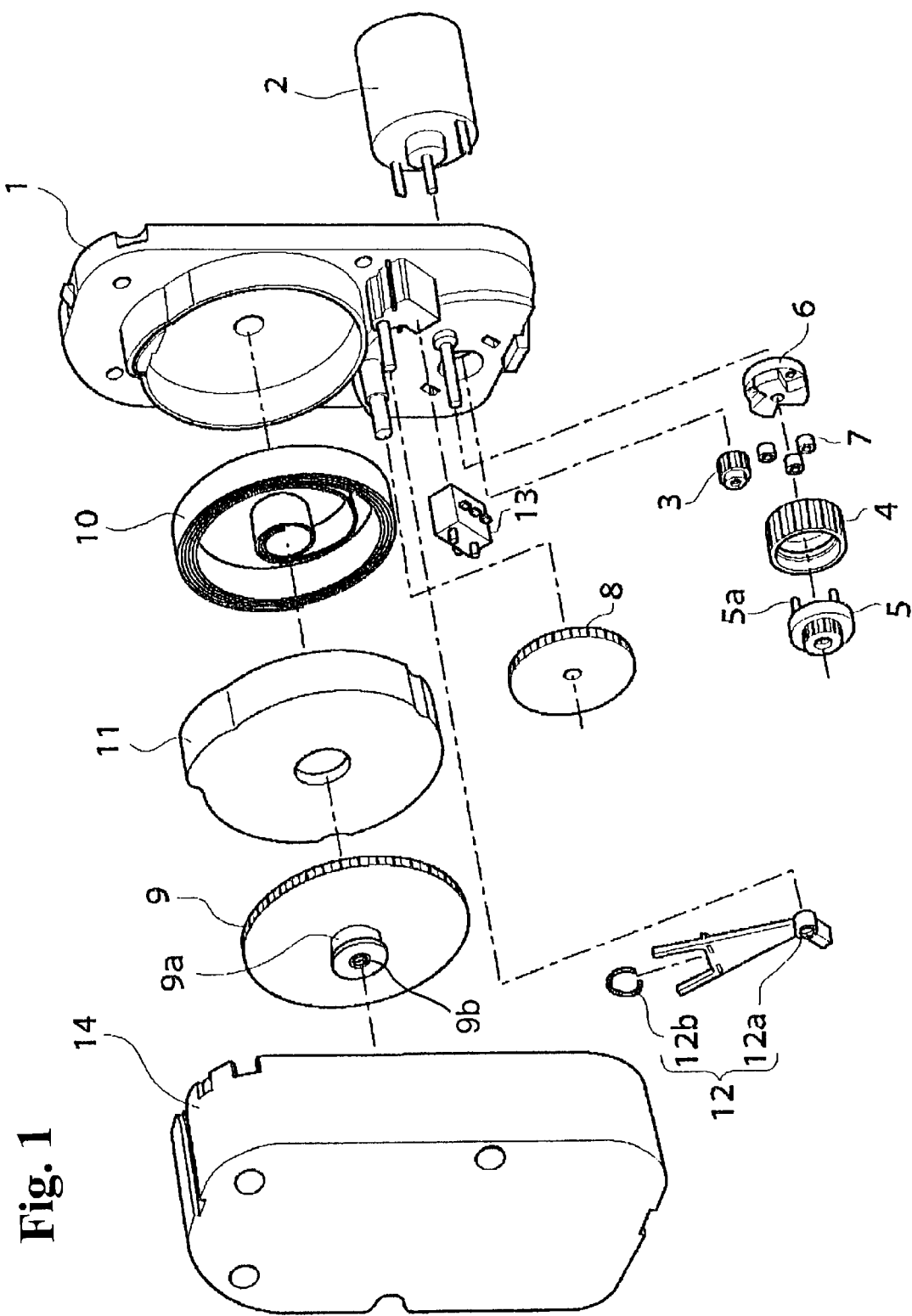
FIG. 1 is an exploded perspective view of a seat belt retractor of an embodiment according to the present invention.

Hereunder, an embodiment according to the present invention is explained with reference to the accompanying drawings. FIG. 1 is an exploded perspective view of a seat belt winding device or retractor of an embodiment according to the present invention. In FIG. 1, reference numeral 1 is a retainer; 2 is a motor; 3 is a motor gear; 4 is an L-gear; 5 is an S-gear; 6 is a holding member; 7 is a roller; 8 is a connect gear; 9 is a bush gear; 9a is a sliding portion; 9b is a spline portion; 10 is a return spring; 11 is a spring cover; 12 is a rotating direction detecting device; 12a is a switch plate; 12b is a switch spring; 13 is a limit switch; and 14 is a cover.

A driving force of the motor 2 attached to the retainer 1 is transmitted to the L-gear 4 through the motor gear 3; then, transmitted to the S-gear 5 through a clutch mechanism structured by the S-gear 5, the holding member 6 and rollers 7; and then, transmitted to the bush gear 9 through the connect gear 8 from the S-gear 5. A rotating shaft of the bush gear 9 is coupled with the return spring 10 to urge rotation of the bush gear 9 toward the seat belt winding direction. Incidentally, in an actual seat belt retractor, while a spool for winding a seat belt therearound is coupled with the spline portion 9b of the bush gear 9, the portion is omitted in FIG. 1. Further, the L-gear 4, S-gear 5 and holding portion 6 are coaxially held by a rotating shaft provided at the retainer 1, and the connect gear 8 is held by another rotating shaft provided at the retainer 1. The bush gear 9 is supported by a rotating shaft provided at the cover 14.

The bush gear 9 includes the sliding portion 9a, an outer peripheral portion of which elastically contacts the switch spring 12b of the rotational direction detecting portion 12. Thus, the switch plate 12a rotates clockwise or counterclockwise according to a rotational direction of the bush gear 9. When the bush gear 9 rotates in a seat belt withdrawing direction, a striker portion of the switch plate 12a pushes a movable piece of the limit switch 13 to turn on. The limit switch 13 and switch plate 12a are also supported by the retainer 1.

The motor 2 is a one-way rotating motor, and is driven in a seat belt winding direction, i.e. in the same direction as an urging direction of the return spring 10.

The S-gear 5, hold block 6 and rollers 7 incorporated into the L-gear 4 constitute the clutch mechanism. When the bush gear 9 is rotated in the seat belt withdrawing direction by an outer force, a mechanical power transmission of the L-gear 4 and the S-gear 5 is disconnected, so that when the seat beat is withdrawn, the motor 2 does not become a load. Also, when the motor 2 is not rotated, in the same manner, the mechanical power transmission of the L-gear 4 and the S-gear 5 is disconnected, so that the motor 2 does not become a load of the winding force of the return spring 10. On the contrary, when the motor 2 is rotated, a driving force is transmitted from the L-gear 4 to S-gear 5 through the clutch mechanism and, finally, winding of the seat belt through the bush gear 9 is carried out by the driving force of the motor 2 and an urging force of the return spring. Detailed explanations of the clutch mechanism are omitted since it is not related to the present invention.

In the seat belt retractor of the present embodiment, it is important that the rotational direction detecting switch includes the rotational direction detecting portion 12 and the limit switch 13. The rotational direction detecting switch is used such that when the bush gear 9 is rotated in the seat belt withdrawing direction, the limit switch 13 is turned on, and driving of the motor 2 is stopped by the output of the limit switch 13.

Figure 3:
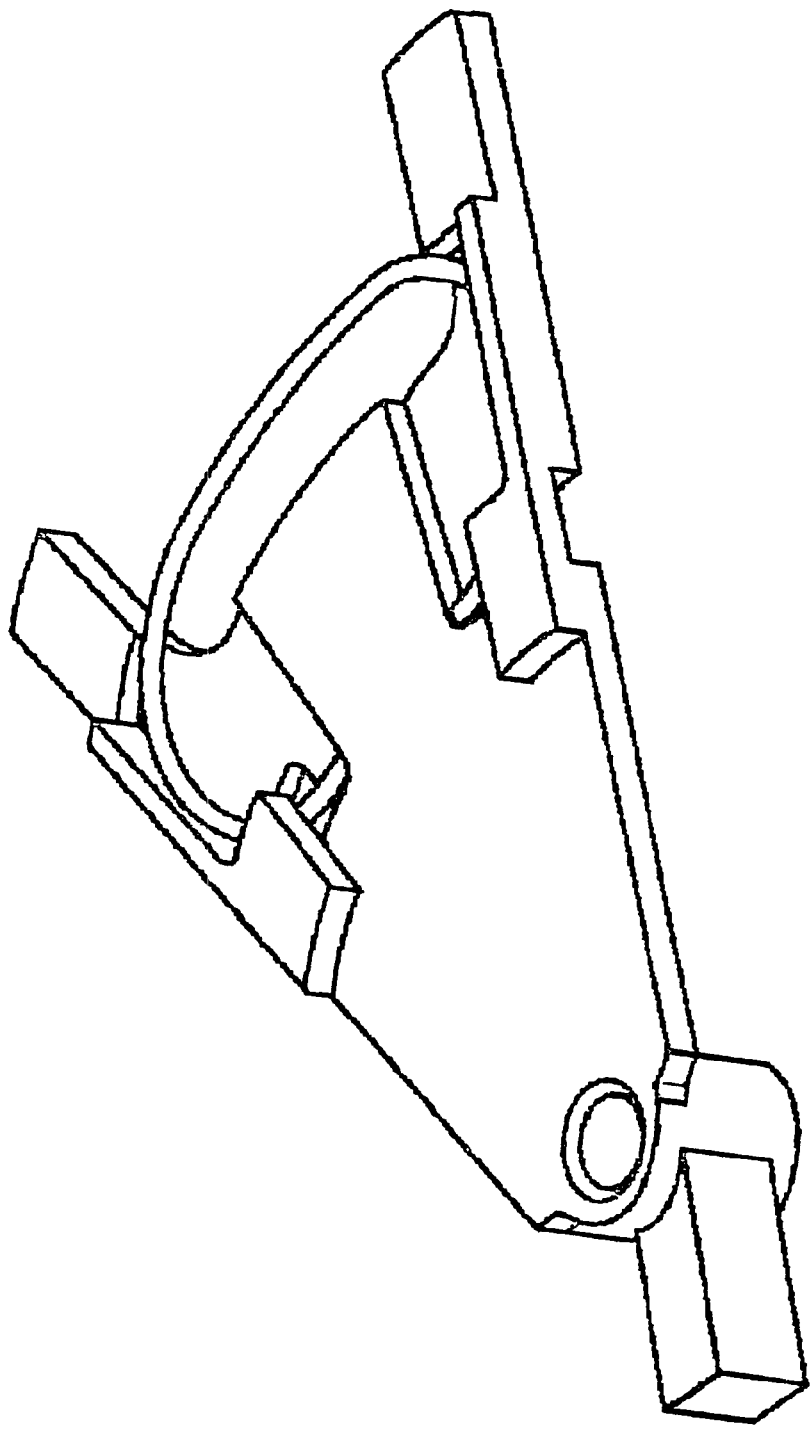
FIG. 3 is a perspective view of the rotational direction detecting portion shown in FIG. 2(a)

FIGS. 2(a) and 2(b) show detailed structure of the rotational direction detecting portion 12, and FIG. 3 shows a perspective view thereof. FIG. 2(a) is a plan view, and FIG. 2(b) is a sectional view taken along line 2(b)—2(b) in FIG. 2(a). In the following drawings including FIGS. 2(a), 2(b) and FIG. 3, the same constitutional elements as those shown in FIG. 1 are represented by the same reference symbols and their explanations are omitted. In FIGS. 2(a) and 2(b), reference numeral 12c is a pressing portion; 12d is a striker; 12e is a rotating shaft hole; and 12f is rotating angle restricting portions, i.e. projecting members; 12f' is an edge portion.

The switch spring 12b is embedded in the switch plate 12a, sandwiched between portions a and b at curved ends 12b', pressed by the pressing portion 12c, and held by the switch plate 12a with its own elastic force thereby not to be dislocated or separated. The switch spring 12b, as described before, elastically contacts the sliding portion 9a of the bush gear 9 to thereby transmit the rotation of the sliding portion 9a to the switch plate 12a through a friction with the sliding portion 9a. The switch spring 12b may be a wire spring.

When switch plate 12a is rotated around a rotating shaft fitted into the rotating shaft hole 12e, the striker 12d pushes the movable piece of the limit switch 13. A forward end of the switch plate 12a is provided with the rotational angle restricting portions 12f. When the switch plate 12a is rotated by a predetermined angle, one of the rotational angle restricting portions 12f contacts the sliding portion 9a of the bush bear 9 to thereby stop rotation of the switch plate 12a. Thereafter, though the switch spring 12b slides along the sliding portion 9a, since the friction therebetween is not so large, the switch spring 12b and the sliding portion 9a do not wear.

In the embodiment according to the present invention, different from the switch plate of the former invention, since the switch spring 12b is used as a member for contacting the sliding portion 9a, a deformation quantity by which the switch spring 12b can be elastically deformed is large. Therefore, even if the rotating shaft of the spool is de-centered or biased, a sufficient pressing force can be obtained and the pressing force does not become too strong. Thus, there are no such occasions that the switch plate does not rotate and parts wear. Also, tolerance or a manufacturing allowable error of the switch plate becomes large, so that its assembling accuracy may not be so strict.

Figure 4:
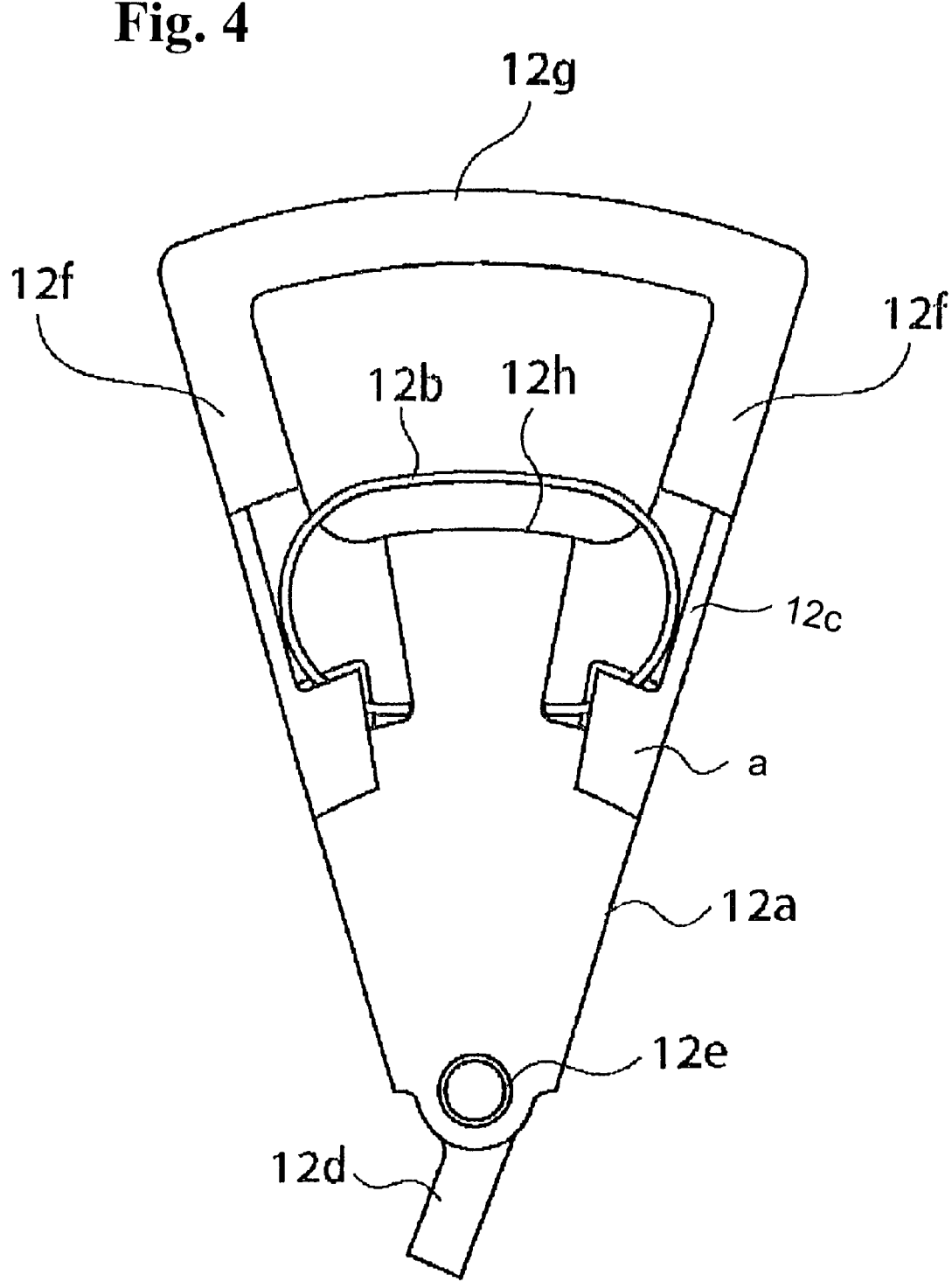
FIG. 4 is a schematic view showing another embodiment of the rotational direction detecting portion.
Figure 5:
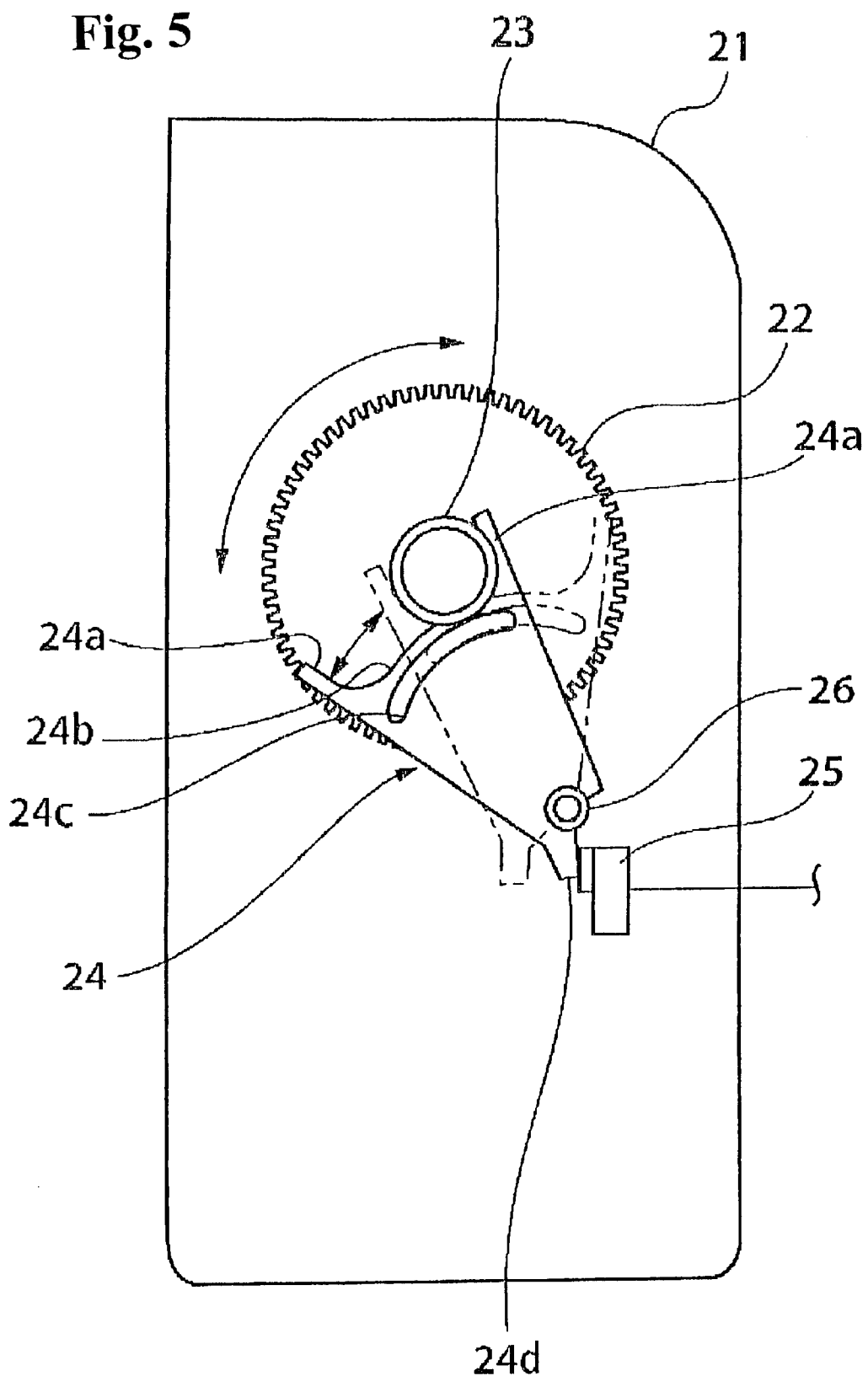
FIG. 5 is a schematic view showing a rotational direction detecting switch used in the former invention.

FIG. 4 shows a detailed drawing of a rotational direction detecting portion 12 of another embodiment. In the embodiment, forward ends of the two rotating angle restricting portions 12f are connected by a connecting member 12g so that a loop portion is formed by the forward edge 12h of the switch plate, rotational angle restricting portions 12f and the connecting member 12g. The switch plate is operated in the same manner as in the switch plate shown in FIGS. 2(a) and 2(b).

In the embodiment, the sliding portion 9a of the bush gear 9 is fitted into the loop portion. Thus, when the seat belt retractor shown in FIG. 1 is assembled, the loop portion of the rotational direction detecting portion 12 is hooked over the sliding portion 9a of the bush gear 9 to be a sub-unit, so that when the bush gear 9 is incorporated, the switch plate 12a is simultaneously incorporated. Thereafter, the rotating shaft is inserted into the rotating shaft hole 12e of the switch plate 12a to thereby easily carry out its assembly.

As described hereinabove, according to the first aspect of the invention, since the spring member is used as a member to contact the rotating member, its possible deformation quantity is large, so that even if the rotating shaft of the rotating member is slightly de-centered or a relative attaching position of the rotating member and the switch plate is changed, there are no such risks that a sufficient power to rotate the switch plate can not be obtained, and that the spring member and switch plate are damaged. Also, its assembling accuracy may not be so accurate.

According to the second aspect of the invention, in addition to the advantages as mentioned in the first aspect, the rotating member and the switch plate can be incorporated as a sub-unit.

According to the third aspect of the invention, there can be obtained a reliably operating seat belt retractor wherein the rotational direction of the spool can be positively detected.

While the invention has been explained with reference to the specific embodiments of the invention, the explanation is illustrative and the invention is limited only by the appended claims.

What is claimed is:

1. A rotational direction detecting switch for detecting a rotational direction of a shaft, comprising:

a switch plate having a support portion for pivotally supporting the switch plate, and restricting members spaced apart from each other for restricting a rotational angle of the switch plate formed at portions away from the support portion, a spring member attached to the switch plate between the restricting members for elastically contacting an outer circumference of the shaft, and a switch situated near the switch plate for detecting a rotating position of the switch plate.

2. A rotational direction detecting switch according to claim 1, wherein said switch plate includes an edge portion between the restricting members, said spring member being located at a position away from the edge portion at a side opposite to the support portion.

3. A rotational direction detecting switch according to claim 2, wherein said spring member is a wire spring with curved ends, and said switch plate further includes holding portions for supporting the curved ends.

4. A rotational direction detecting switch according to claim 3, wherein said restricting members project radially outwardly beyond the edge portion relative to the support portion.

5. A rotational direction detecting switch according to claim 4, wherein said switch plate further includes a striker near the support portion, said striker, upon movement of the switch plate, actuating the switch.

6. A rotational direction detecting switch according to claim 1, wherein said restricting members are formed on two lateral sides of the switch plate at a forward side thereof, and forward ends of said restricting members being connected by a connecting member so that a loop is formed by the forward side of the switch plate, the restricting members and the connecting member to allow the shaft to be located in the loop.

7. A seat belt retractor comprising said rotational direction detecting switch according to claim 1.

* * * * *